Patented Dec. 21, 1937

2,103,186

UNITED STATES PATENT OFFICE 2,103,186

CHLORINATED RUBBER COATING COMPOSITION

Jacob M. Schantz, Wilmington, Del., assignor to Hercules Powder Company, Wilmington, Del., a corporation of Delaware No Drawing. Application July 2, 1935, Serial No. 29,505

9 Claims. (Cl. 134—17)

This invention relates to a coating composition of chlorine containing compounds of rubber, and more particularly to a coating composition including a chlorine containing compound of rubber and tung oil or China-wood oil.

It has heretofore been proposed to use tung oil in chlorinated rubber coating compositions in place of linseed oil, since by the use of tung oil a tougher, quicker drying film is obtained which is more resistant to chemical action. However, the use of raw tung oil in chlorinated rubber coating compositions is, as a practical matter, substantially impossible unless resins are used with it. Despite the most careful formulation and preparation of a resin-free coating composition, the products obtained will dry with a wrinkled and frosted appearance and will swell and wrinkle even more upon the application of the succeeding coat. Since the presence of resins greatly decreases the toughness and chemical resistance of the chlorinated rubber-tung oil film, chlorinated rubber coating compositions containing resins cannot be satisfactorily used in place of resin-free products for many purposes.

It has also been proposed heretofore to use a heat treated or "kettle bodied" tung oil in chlorinated rubber coating compositions in order to correct the difficulties encountered with chlorinated rubber-tung oil compositions. However, such coating compositions containing chlorinated rubber and heat treated or polymerized tung oil are extremely unstable and very soon gel and will completely solidify on prolonged storage. They are accordingly useful only when freshly prepared, and cannot consequently be considered of commercial value.

Now in accordance with this invention, it has been found that coating compositions containing chlorinated rubber and/or chlorinated rubber hydrochloride having all the advantages of toughness, quick drying, chemical resistance, etc. of the prior chlorinated rubber compositions, without the disadvantages of gelling or producing wrinkled or frosted films, may be produced from chlorinated rubber and/or chlorinated rubber hydrochloride, and a tung oil which has been subjected to a special heat treatment and which is commonly designated and will be hereinafter referred to as "thermolyzed" tung oil.

Either chlorinated rubber, chlorinated rubber hydrochloride, or admixtures of the two may be used in formulations with "thermolyzed" tung oil in accordance with this invention. Admixtures of the two may be used in any desired proportions, provided they have substantially the same viscosity characteristics. When products widely divergent in viscosity characteristics are used in admixture, it will be found that the film produced will show an undesirable incompatability haze. However, entirely satisfactory films are produced when products of substantially the same viscosity characteristics are used.

The chlorinated rubber for use in accordance with this invention may be produced by any of the methods well known to the art, and will preferably have a chlorine content of about 50% to about 67%. The chlorinated rubber hydrochloride for use in accordance with this invention may be made by any of the methods well known to the art and may have a chlorine content within the range of about 30% to about 68%, although it is preferable to use a compound having a chlorine content within the range of 50-68%. Other equivalent chlorine-containing compounds of rubber-like materials such as gutta percha, balata products, etc. may be used in place of chlorinated rubber or chlorinated rubber hydrochloride.

"Thermolyzed" tung oil is prepared by heating tung oil to a temperature of over 600° F. so rapidly that it cannot gel or solidify while passing through the temperature range in which gelation normally occurs, and holding the oil at this temperature until the desired modification in its properties takes place, but not so long as to destroy the drying properties of the oil. This procedure for the production of "thermolyzed" tung oil is described in more detail in U. S. P. No. 1,903,686, granted April 11, 1933 to Floyd M. Reece. The expression "thermolyzed" tung oil as used in this specification and in the claims hereinafter set forth will accordingly be understood to apply to the treated tung oil still possessing drying properties described in this patent.

Such "thermolyzed" tung oil possessing drying properties may, for example, be prepared, as described in the said patent, by passing untreated tung oil through a sixty foot coil maintained at a temperature of about 675° F. at a rate of forty-five gallons per hour. The treated oil discharged from the coil should be immediately cooled to a temperature of about 200° F. It is essential, if the drying properties of the oil are not to be destroyed, that the heat treatment be carried out at not too high a temperature and for not too long a period of time.

The coating compositions in accordance with this invention will comprise essentially chlorinated rubber and/or chlorinated rubber hydrochloride, and "thermolyzed" tung oil. These materials may be used in widely varying proportions in the production of these coating compositions depending upon the particular uses for which the products are intended. A range of from about 0.1 part to about 3 parts of "thermolyzed" tung oil per part of chlorinated rubber represents a preferred range of proportions, but does not indicate in any way the limits of formulation in accordance with this invention.

The range of proportions of chlorinated rubber hydrochloride and "thermolyzed" tung oil which can be used is dependent on the chlorine content of the chlorinated rubber hydrochloride. With samples having a chlorine content of less than approximately 50%, proportions of "thermolyzed" tung oil up to 15% may be used without evidence of incompatability. With chlorinated rubber hydrochloride containing 50% or more chlorine any desired proportions may be used. With chlorinated rubber hydrochloride containing 50% or more chlorine, a range of from about 0.1 part to about 3 parts of "thermolyzed" tung oil per part of chlorinated rubber represents a preferred range of proportions, but does not indicate a limit to the range of useful formulations which may be made in accordance with this invention.

If desired, natural and synthetic resins, as, for example, cumarone resins, polyhydric alcohol-polybasic acid resins, dammar gum, copals, etc. may be used in the formulation of coating compositions in accordance with this invention, particularly when higher ratios of tung oil to chlorinated rubber and/or chlorinated rubber hydrochloride are employed. However, where maximum chemical resistance in the film formed is desired, it will not be desirable to use resins. Various pigments and the like may also be included in the coating compositions if desired.

Where more than 1 part of tung oil to 1 part of chlorinated rubber and/or chlorinated rubber hydrochloride is used in the production of the coating compositions, it will be found desirable to include a small amount of a drier, as, for example, a cobalt, lead, manganese linoleate, etc.

Ordinarily the non-volatile ingredients of the coating composition in accordance with this invention, i. e., chlorinated rubber and/or chlorinated rubber hydrochloride, "thermolyzed" tung oil, and resins, pigments, drier, etc., if these are used, will be dissolved before being used in a volatile solvent or thinner in amount sufficient to produce a coating composition of sufficient fluidity for easy application. Organic solvents, as, for example, xylol, ethylene dichloride, butyl acetate, etc. will ordinarily be used as solvents or thinners.

The table below shows, by way of illustration of the practical embodiment of this invention, the composition of the non-volatile part of various representative coating compositions produced in accordance therewith:

TABLE I

| Formula No | 1 | 2 | 3 | 4 | 5 | 6 | 7 |
|---|---|---|---|---|---|---|---|
| | Parts by weight | | | | | | |
| Chlorinated rubber (or chlorinated rubber hydrochloride) | 20 | 20 | 20 | 20 | 20 | 20 | 20 |
| "Thermolyzed" tung oil | 7 | 10 | 10 | 10 | 10 | 20 | 40 |
| Cumarone resin | | | 5 | | | | |
| Polyhydric alcohol-polybasic acid resin | | | | 5 | | | |
| Hydrogenated methyl abietate | | | | | 5 | | |
| Cobalt drier (50%) | | | | | | 1 | 2 |

The final coating composition may be made, for example, by dissolving one part of the compositions set out above in from two to six parts of a volatile solvent. A typical solvent mixture for this purpose consists of:

| | Parts by weight |
|---|---|
| Xylol | 15 |
| V. M. & P. naphtha | 10 |
| Hiflash naphtha | 50 |

The superiority of coating compositions in accordance with this invention over prior art chlorinated rubber compositions containing, for example, linseed oil, is shown by the following table giving comparative results for identical tests made on the respective films produced from four chlorinated rubber coating compositions:

TABLE II

*Protective paint for metal*

| Formula No | 1 | 2 |
|---|---|---|
| Chlorinated rubber (or chlorinated rubber hydrochloride) | 20 parts by weight | 20 parts by weight |
| "Thermolyzed" tung oil | 10 parts by weight | — parts by weight |
| Bodied linseed oil | — parts by weight | 10 parts by weight |
| Chrome yellow pigment | 15 parts by weight | 15 parts by weight |
| Time required to fail in 10% HCl solution (chlorinated rubber) | 16 days | 6 days |
| Time required to fail in 2% NaCl solution (chlorinated rubber) | 5 months | 16 days |

*Wood paint*

| Formula No | 3 | 4 |
|---|---|---|
| Chlorinated rubber (or chlorinated rubber hydrochloride) | 20 parts by weight | 20 parts by weight |
| "Thermolyzed" tung oil | 60 parts by weight | — parts by weight |
| Bodied linseed oil | — parts by weight | 60 parts by weight |
| Iron oxide pigment | 200 parts by weight | 200 parts by weight |
| Time required to fail from atmospheric exposure (chlorinated rubber) | Not failed after 6 months | 35 days |

It will be understood that the details and examples set forth above are illustrative only, and are not in any way in limitation of the invention as herein broadly described and claimed.

It will be further understood that in the claims appended hereto, where the term chlorine containing compound of rubber is used, such is intended to include chlorinated rubber, chlorinated rubber hydrochloride or other equivalent chlorine containing compounds of rubber or rubber-like materials such as gutta percha or balata products.

What I claim and desire to protect by Letters Patent is:

1. A coating composition comprising a substantially homogenous solution of chlorinated rubber and "thermolyzed" tung oil, the "thermolyzed" tung oil being present in sufficient quantity to render the film deposited by said coating composition smooth, tough, and chemically resistant, said coating composition being further characterized by the fact that it will not gel on storage.

2. A coating composition comprising a substantially homogenous solution of chlorinated rubber, "thermolyzed" tung oil and a resin, the "thermolyzed" tung oil being present in sufficient quantity to render the film deposited by said coating composition smooth, tough, and chemically resistant, said coating composition being further characterized by the fact that it will not gel on storage.

3. A coating composition comprising a substantially homogenous solution of chlorinated rubber and "thermolyzed" tung oil having a pigment admixed therewith, the "thermolyzed" tung oil being present in sufficient quantity to render the film deposited by said coating composition smooth, tough, and chemically resistant, said coating composition being further characterized by the fact that it will not gel on storage.

4. A coating composition comprising a substantially homogenous solution of chlorinated rubber hydrochloride and "thermolyzed" tung oil, the "thermolyzed" tung oil being present in sufficient quantity to render the film deposited by said coating composition smooth, tough, and chemically resistant, said coating composition being further characterized by the fact that it will not gel on storage.

5. A coating composition comprising a substantially homogenous solution of chlorinated rubber hydrochloride, "thermolyzed" tung oil and a resin, the "thermolyzed" tung oil being present in sufficient quantity to render the film deposited by said coating composition smooth, tough, and chemically resistant, said coating composition being further characterized by the fact that it will not gel on storage.

6. A coating composition comprising a substantially homogenous solution of chlorinated rubber hydrochloride and "thermolyzed" tung oil having a pigment admixed therewith, the "thermolyzed" tung oil being present in sufficient quantity to render the film deposited by said coating composition smooth, tough, and chemically resistant, said coating composition being further characterized by the fact that it will not gel on storage.

7. A coating composition comprising a substantially homogenous solution of a chlorine-containing compound of rubber selected from the group consisting of chlorinated rubber and chlorinated rubber hydrochloride, and "thermolyzed" tung oil, the "thermolyzed" tung oil being present in sufficient quantity to render the film deposited by said coating composition smooth, tough, and chemically resistant, said coating composition being further characterized by the fact that it will not gel on storage.

8. A coating composition comprising a substantially homogenous solution of a chlorine-containing compound of rubber selected from the group consisting of chlorinated rubber and chlorinated rubber hydrochloride, "thermolyzed" tung oil and a resin, the "thermolyzed" tung oil being present in sufficient quantity to render the film deposited by said coating composition smooth, tough, and chemically resistant, said coating composition being further characterized by the fact that it will not gel on storage.

9. A coating composition comprising a substantially homogenous solution of a chlorine-containing compound of rubber selected from the group consisting of chlorinated rubber and chlorinated rubber hydrochloride, and "thermolyzed" tung oil having a pigment admixed therewith, the "thermolyzed" tung oil being present in sufficient quantity to render the film deposited by said coating composition smooth, tough, and chemically resistant, said coating composition being further characterized by the fact that it will not gel on storage.

JACOB M. SCHANTZ.